(12) United States Patent
Cohen et al.

(10) Patent No.: US 11,416,516 B2
(45) Date of Patent: Aug. 16, 2022

(54) PRIORITIZATION AND QUALITY-OF-SERVICE CONTROL FOR NEAR-ZERO-ADDED-LATENCY ANY POINT IN TIME VIRTUAL REPLICATION

(71) Applicant: EMC IP Holding Company LLC, Hopkinton, MA (US)

(72) Inventors: Saar Cohen, Moshav Mishmeret (IL); Jehuda Shemer, Kfar Saba (IL); Kfir Wolfson, Beer Sheva (IL); Itay Azaria, Dimona (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 126 days.

(21) Appl. No.: 16/878,942

(22) Filed: May 20, 2020

(65) Prior Publication Data

US 2021/0365474 A1 Nov. 25, 2021

(51) Int. Cl.
*G06F 15/16* (2006.01)
*G06F 16/27* (2019.01)
*G06F 9/48* (2006.01)
*G06F 16/23* (2019.01)

(52) U.S. Cl.
CPC ............ *G06F 16/27* (2019.01); *G06F 9/4881* (2013.01); *G06F 16/2365* (2019.01)

(58) Field of Classification Search
None
See application file for complete search history.

(56) References Cited

U.S. PATENT DOCUMENTS 9,507,845 B1 * 11/2016 Natanzon ............ G06F 11/2094

* cited by examiner

*Primary Examiner* — Alex Gofman
(74) *Attorney, Agent, or Firm* — Workman Nydegger

(57) ABSTRACT

Prioritization and quality of service control operations for any PiT replication operations. When replicating data from a production site to a replica site, the transmission of data is prioritized based on the perspective of a splitter and based on the perspective of an appliance, which may coordinate with multiple splitters. Quality is controlled by prioritizing which data is sent. The transmission may also perform compression when transmitting the data and may handle situations where available resources are scarce or unavailable.

20 Claims, 6 Drawing Sheets

PRIORITIZATION AND QUALITY-OF-SERVICE CONTROL FOR NEAR-ZERO-ADDED-LATENCY ANY POINT IN TIME VIRTUAL REPLICATION

FIELD OF THE INVENTION

Embodiments of the present invention generally relate to data protection and data protection operations. More particularly, at least some embodiments of the invention relate to systems, hardware, software, computer-readable media, and methods for data protection operations including backup operations, replication operations, and prioritization operations.

BACKGROUND

There are a variety of ways to protect applications and data. For example, data can be protected by replicating data from a production site to a replica site. This process can be used to perform point-in-time (PiT) operations, where data can be recovered to different points-in-time. However, conventional replication systems often introduce latency that are often viewed as unacceptable.

For example, some storage technologies, such as NVMe (Non-Volatile Memory Express) are associated with latencies on the order of 20 microseconds. However, the write latency associated with replicating the data may be on the order of over a hundred microseconds. The latency is typically introduced because the writes are intercepted and synchronously sent to a replication appliance. As a result of this latency, protecting systems that use storage technologies such as NVMe introduces a noticeable overhead.

This type of overhead, as well as other inefficiencies or latencies are significant for many reasons including the reason that data protection systems may be associated with service level objectives (SLOs), which may be key elements of a service level agreement (SLA). The ability to comply with SLOs is important and latencies in the data protection system can often impede the ability of the data protection system to comply with the SLOs of the SLA.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
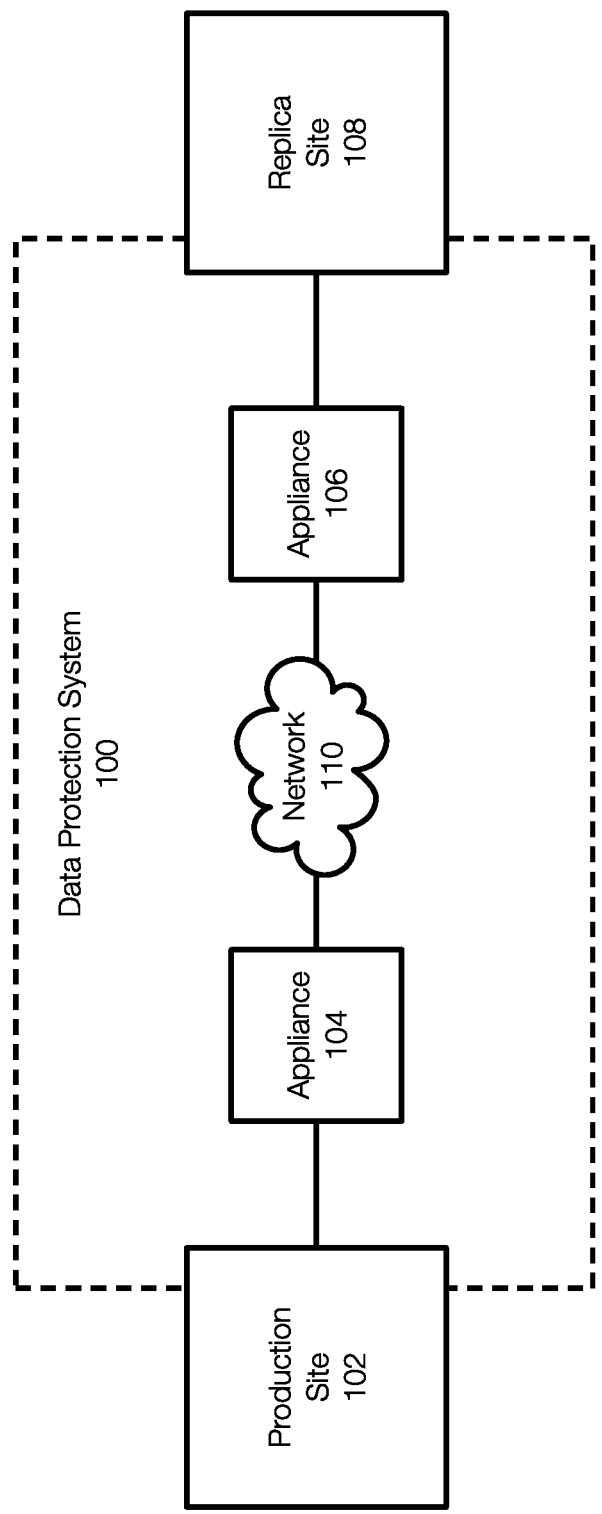
FIG. 1 illustrates an example of a data protection system configured to perform data protection operations including replication operations.

Embodiments of the present invention generally relate to data protection and data protection operations. More particularly, at least some embodiments of the invention relate to systems, hardware, software, computer-readable media, and methods for data protection operations including, but not limited to, backup operations, recovery operations, replication operations, prioritization operations, resource management operations, any PiT (any Point-in-Time) replication operations, or the like or combination thereof.

More specifically, embodiments of the invention relate to replication operations that includes smart quality-of-service controls and prioritization. When performing replication and replication related operations, the data protection system is configured to optimize available resources by allocating resources to the workloads most in need for maximum user value. The need may be based on status of replication, user input, or the like.

This includes, as discussed in more detail herein, a data protection system configured to control the speed of data transfer or data evacuation from one or more buffers or data sources and configured to improve and increase the utilization of resources using, for example, compression. Compression can allow bandwidth to be used more effectively, but may impact other resources such as processor cycles.

Data protection systems may allow user to define or specify protection for a specific workload such as an application, a virtual machine, a consistency group, or the like. Often, an SLO (Service Level Objective) is attached to the specified protection. By way of example, the SLO may be assigned at a consistency group level. By way of example only, a consistency group may define a group of devices (e.g., machines, virtual machines, applications, storage, virtual disks) that are protected together. Stated differently, a consistency group may contain one or more disks (e.g., LUNs—Logical Unit Numbers) that are accessed by a protected machine. A LUN may designate an individual or collection of physical or virtual devices. This allows the consistency group to be backed up or replicated as a whole and recoverable to a state that is consistent for the machine or application being protected.

The SLO for continuous protection operations such as replication may be defined in terms of RPO (Recovery Point Objective). RPO describes the amount of data that may be lost when recovering to a secondary copy after a disaster, failure or other issue. RPO can also be thought of as the lag between the workload and the replica copy.

As the RPO becomes lower, to a value of 0 (which means that the replica copy is in lock-step with the production, also called Sync replication), the requirements from the protection engine increase. Lowering the RPO typically requires sending data to the replica site faster and with less latency. In addition, each protected workload/application/machine may be associated with a priority. More resources and priority in handling are typically provided to higher priority applications and workloads to help ensure that an SLO violation does not occur.

However, resources are not unlimited and, at the same time, are associated with a cost. Embodiments of the invention provide replication mechanisms that are configured to manage various system resources such as host memory, processor usage or cycles, and network bandwidth. Embodiments of the invention relate to replication operations, performed by hardware including networking hardware, processors, memory, and other circuitry, that are able to manage these resources from a local perspective (e.g., from the perspective of a single splitter) and from a global perspective (e.g., from the perspective of an appliance that may coordinate with multiple splitters). As replication workloads are added to a data protection system and SLOs are defined for those workloads, the amount of resources needed to comply with the SLOs may increase.

By way of example only, some of the resources that may become constrained while performing replication and replication related operations include host memory and network bandwidth.

When replicating writes or IOs of a production system, the data protection system may use a splitter. The splitter includes a journal manager that maintains a journal that stores copies of the writes in the production system, often in an ordered fashion. The data stored in the journal can then be transmitted to the replica site asynchronously. This allows some of the latencies to be eliminated. More specifically, the journal may function as a buffer such that the speed of the operation is improved and latencies are reduced.

With regard to the host memory, however, the main component that uses the memory of the host (and thus computing resources) is the journal manager, which maintains the journal. The journal manager needs to ensure that the memory resources made available to the journal manager are not over utilized. In many instances, the memory available for the journal may be limited at least because the memory is needed for the day-to-day operations of the host.

With regard to network bandwidth, replication operations require evacuating content from the splitter journal by transmitted the content to a replication engine (e.g., a replication appliance (RPA). The appliance then sends the data evacuated from the splitter journal over a network to the replica site. This transmission from the journal to the appliance is performed over a network interface, whose bandwidth is often limited. As a result, the use of this resource network bandwidth should be used smartly. For example, the most critical data should be sent first. The criticality of the data can be determined in terms of importance to a user or in terms of available computing resources, or the like or combination thereof.

Generally, the data protection system performs replication using a series of buffers. These buffers allow data to be aggregated to make handling the data more efficient. These buffers, in order to be efficient, should always have some free space to accommodate incoming new data. Thus, the buffers are emptied or evacuated as the data protection system processes the data and moves the data to the next phase of the replication operation. The splitter journal of a host is often the first buffer in the chain of buffers because the splitter journal is closest to the production source. The production side appliance can be viewed as a second buffer in the chain of buffers.

When a buffer starts to become full, the data protection system needs to accommodate or address the situation by either regulating the speed of new incoming data or by changing the replication mode or replication parameters to reduce the amount of the resource that is needed. Regulating the speed of new incoming data introduces intentional delays into the replication operation and changing the replication mode or replication parameters often incurs the cost of reduced functionality.

Embodiments of the invention ensure that resources are distributed in an appropriate manner. Typically, evenly distributing the resources to the various workloads is not the most desirable allocation because some of the workloads will have a tighter SLO or a higher priority. Workloads with a higher priority or tighter SLOs should receive relatively larger amounts of the available resources.

Embodiments of the invention include prioritizing workloads and/or allocating resources, by way of example, to ensure that replication operation is performed efficiently and in a manner that is likely to comply with SLOs. Prioritizing workloads and allocating resources is performed in a manner that accounts for multiple buffers associated with the replication operation performed by the data protection system. Embodiments of the invention can prioritize the replication operations in a centralized and coordinated manner.

For example, with regard to host memory, the splitter may handle the allocation of resources according to its knowledge of relative importance (priorities) and SLOs. The splitter may also be configured to take into account a global view of the data replication system, which global view accounts for resources that may be used by or allocated to other splitters. More specifically, journal evacuation typically consumes bandwidth between the splitter and an appliance. However, the appliance may communicate with multiple splitters.

In this situation where an appliance may coordinate with multiple splitters, a particular splitter may operate as if one of its workloads has the highest priority when, in fact, the highest priority workload is associated with a different splitter. Embodiments of the invention allow for prioritization and resource allocation that include the holistic perspective of an appliance or cluster of appliances as well as the localized perspectives of the splitters.

FIG. 1 illustrates an example of a data protection system configured to perform data protection operations including replication operations and replication related operations such as prioritization operations. FIG. 1 illustrates a data protection system 100 that performs data protection operations such as replicating data from a production site 102 to a replica site 108. This may include replicating protected machines, whether virtual or physical.

In one example, the replication is performed by an appliance on the production side that coordinates with a similar appliance on the replica side. Portions of the data protection system (e.g., splitters, journal managers, journals) may be integrated in the production site 102 or components or machines thereof. The replica site 108 or portion thereof may be integrated or associated with the data protection system.

The production site 102 may be operating in a cloud (e.g., a datacenter or datacenters) or may be an on-premise site. The replica site 108 may also be operating in a cloud environment and may use storage and services provided by a cloud provider. The data replicated by the data protection system 100 is typically transmitted over a network 110, which may include a local area network, a wide area network, the Internet, a telecommunication network, or the like or combination thereof. The production site 102 and the replica site 108 are also associated with storage such as storage area networks (SAN), or other storage devices. Data from the storage of the production site is replicated to the storage of the replica site. Further, the production site 102 and of the replica site 108 may include physical and/or virtual configurations.

Generally, IOs in the production site are intercepted and transmitted to the appliance 104 (a production side appliance or cluster). The appliance 104 then transmits the data to an appliance 106 (a replica site appliance or cluster). The appliance 106 then ensures that the received data is stored at the replica site. In the event of a disaster, the production site (or portions thereof) can failover to the replica site. Alternatively, the replica site can be launched as a production site and the production site may become the replica site.

FIG. 1 further illustrates a chain of buffers previously mentioned. The first buffer may be a journal at the production site. The data is transmitted from the journal to the appliance 104, which may have another buffer. Similarly, the appliance 106 and replica site 108 may also implement buffers to facilitate the replication of data between the production site 102 and the replica site 108.

Figure 2:
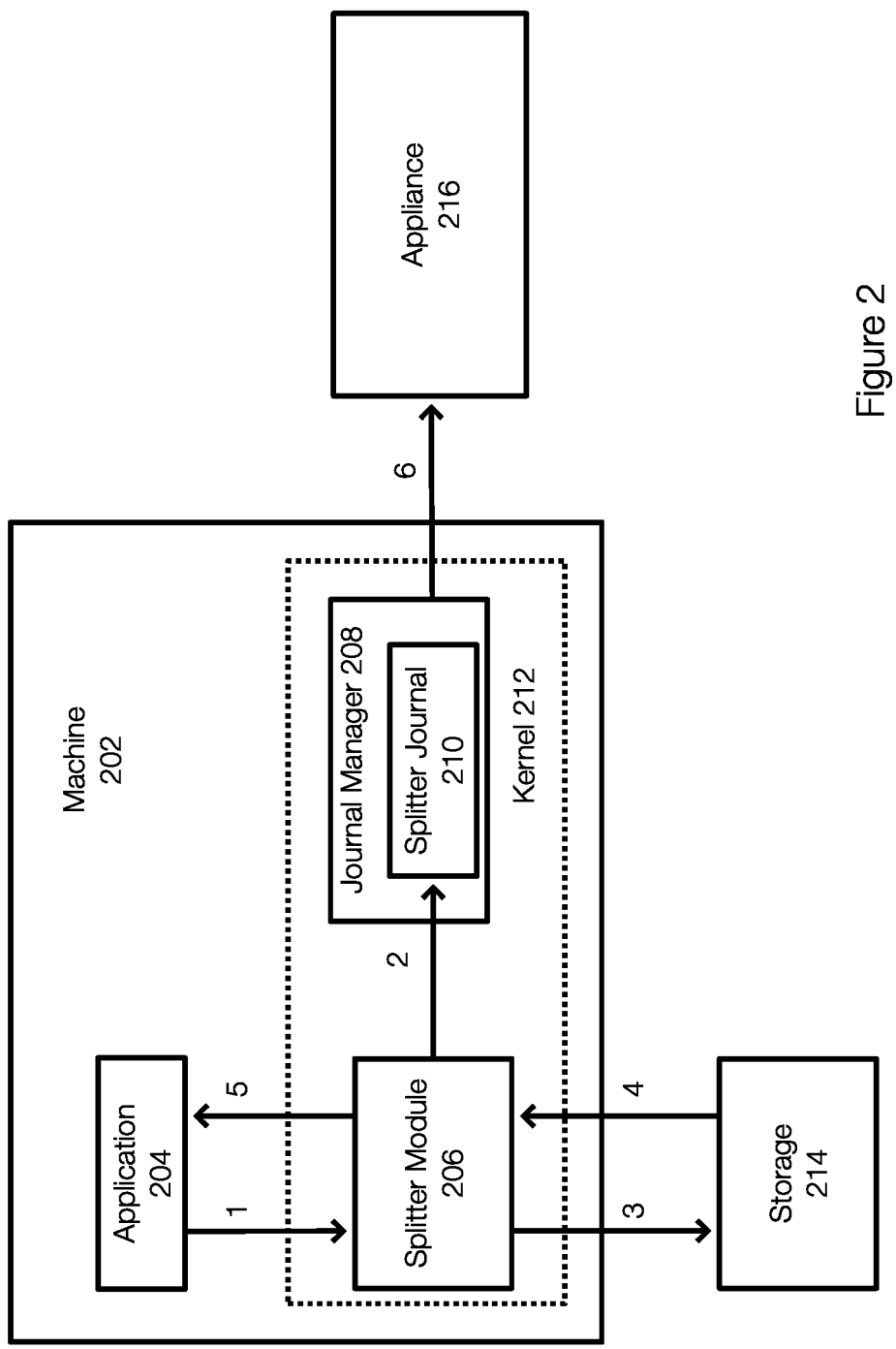
FIG. 2 illustrates an example of a splitter configured to perform replication in the context of a physical machine or system.

FIG. 2 illustrates an example of a splitter implemented in a physical machine. FIG. 2 illustrates a machine 202 (e.g., a physical machine) that includes a kernel 212 (e.g., a kernel of an operating system). An application 204 may operate on the operating system and may perform IOs with respect to a storage 214. By way of example, the application 204 or the machine 202 may be associated with one or more LUNs. In one example, the LUNs associated with the protected application 204 or machine 202 constitute a consistency group. The LUNs may be storage that is local to the machine 202, network based, or the like.

In this example, a splitter module 206 is implemented in the kernel 212. A journal manager 208 is also associated with the splitter module 206 and may be implemented in the kernel 212. The journal manager 208 manages a splitter journal 210. The journal managers 208 and the splitter journal 210 may be part of the splitter module 206. The splitter module 206, the journal manager 208 and the splitter journal 210 may be referred to as a splitter.

In the context of replicating data, the splitter module 206 intercepts or receives an IO from an application 204. However, the splitter module 206 does not usually send each write or IO to an appliance 216 inline. Rather, the splitter module 206 causes the write to be stored in the splitter journal 210. As previously stated, the splitter journal 210 requires memory of or used by the machine 202 and thus consumes resources of the machine 202. Further, a journal is typically maintained for each consistency group. As a result, there may be more than one journal. As previously stated, a consistency group may contain one or more disks (e.g., LUNs) that are accessed by a protected machine or a protected application, or the like.

The journal manager 208 maintains the splitter journal 210. Incoming IOs to the splitter module 206 are stored, by way of example only, in two streams: a metadata stream and a data stream. The data saved in in the data stream may include IO data. The data stored in the metadata stream may include IO metadata (e.g., volume ID, IO offset, IO length), and/or IO number or timestamp (which allows parallel sending and retries).

These streams stored in the splitter journal 210 can then be transmitted from the journal 210 to the appliance 216 and then to a replica side appliance. The streams are configured to store the IOs in a specific order. This order ensures that, if recovery is necessary at the replica site, that the machine 202 or application 204 can be recovered to any PiT supported by the replicated data.

FIG. 2 illustrates an example of the replication path. At 1, the splitter module 206 intercepts the IO written by the application 204 or by the machine 202. At 2, the IO data and IO metadata is written to the splitter journal 212 in the memory of the machine 202. The acknowledgement from the journal is typically immediate. At 3, the IO is transmitted to the storage 214. At 4, an acknowledgment is received from the storage 214. At 5, the IO is acknowledged to the application 204 or to the machine 202.

In this example, the transmission of the data stored in the splitter journal 210 to the appliance 216 at 6 can be performed outside of steps 1-5. Stated differently, the data stored in the splitter journal 210 may be sent asynchronously at 6 to the appliance 216.

The journal manager 208 (or the splitter in general) is tasked with evacuating the splitter journal 210. More specifically, the journal manager 208 sends the data accumulated in the splitter journal 210 to the appliance 216 (e.g., asynchronously). Once an acknowledgement is received from the appliance 216, the journal manager 208 clears the sent portions from the splitter journal 210. This frees memory for new IOs or writes. The transmission of data (e.g., the metadata and data streams) from the splitter journal 210 may be performed in sequence from the oldest IO to the newest IO. This may help keep order fidelity. However, the data can be sent in parallel when the metadata includes information numbering the entries in the streams. This also allows for retries in the event of a failed transmission.

Sending the IOs or data in the splitter journal 210 in batches often improves the total throughput. Batching reduces the number of IOs per second (IOPS) sent from the splitter to the appliance 216.

Figure 3:
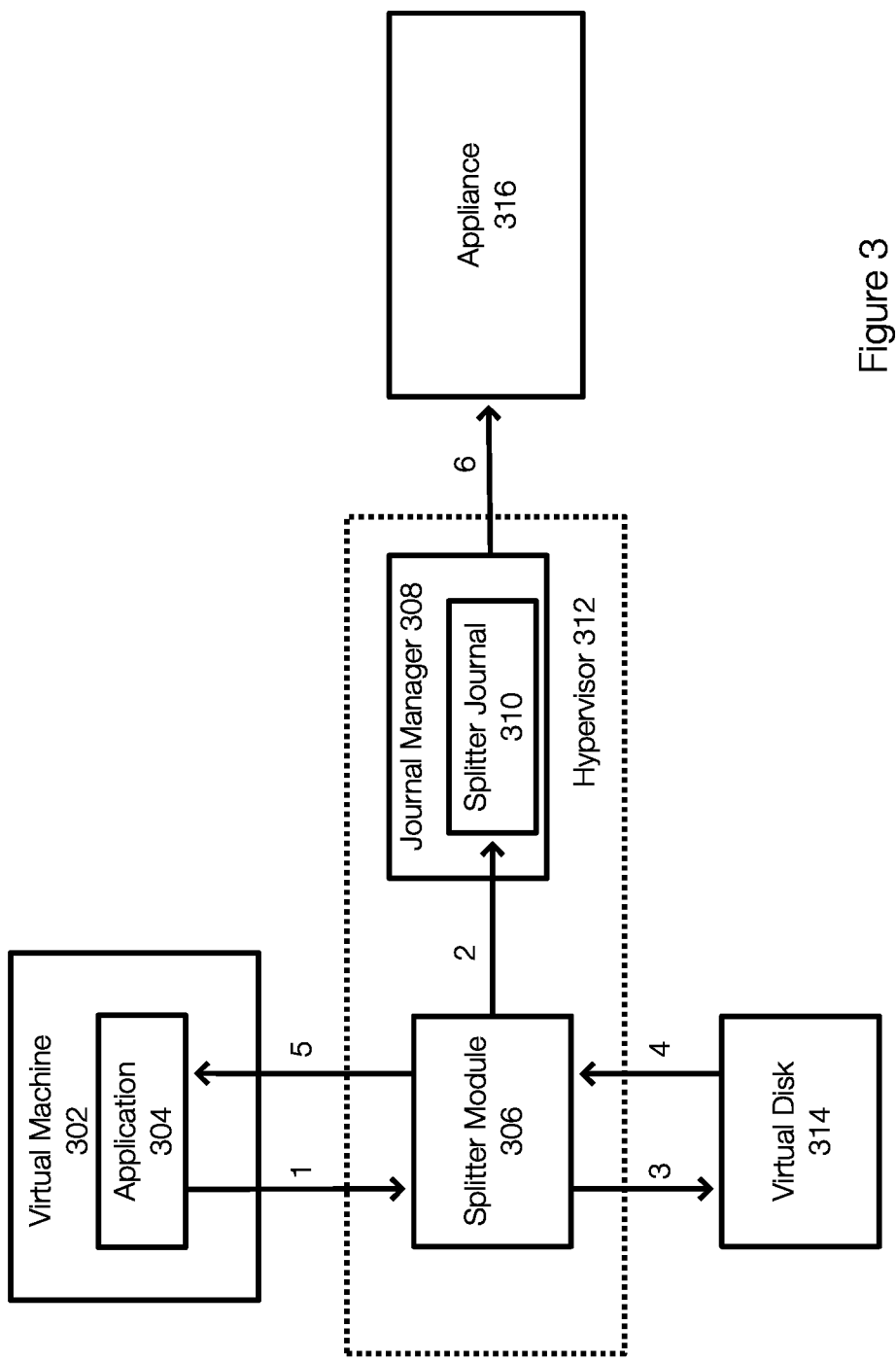
FIG. 3 illustrates an example of a splitter configured to perform replication in the context of a virtual machine or system.

FIG. 3 illustrates an example of performing data protection operations (e.g., replication operations) in a situation where a virtual machine is protected. In the virtual case (compared to the physical case of FIG. 2), the splitter module 306, journal manager 308 and splitter journal 310 (collectively a splitter) reside in a hypervisor 312.

The virtual machine 302, which may be running an application 304, sits on the hypervisor 312. The replication flow occurs as follows. At 1, an IO from the virtual machine is intercepted by the splitter module 306. At 2, the splitter module 2 sends the to the splitter journal 310. The splitter journal 310 may store data in at least two streams: a data stream and a metadata stream as previously described.

At 3, the IO is written to a virtual disk 314 and the write to the virtual disk 314 is acknowledged at 4. At 5, the write is acknowledged to the application 304. The data stored in the splitter journal 310 is transmitted at 6 to the appliance 316. This may be performed asynchronously from the rest of the replication flow.

As illustrated in FIGS. 2 and 3, the splitter journals 210 and 310 reduce, if not eliminate, the introduction of latency for any-PiT protected applications. This is advantageous for latency-sensitive applications running on low-latency storage such as NVMe and low-latency virtual machine disks.

Embodiments of the invention thus relate to both physical systems and virtual systems and use-cases. By way of example, a host may refer the system that hosts the splitter. In the physical case, this may be the machine that actually runs the splitter in its kernel. In the virtual case, the host may be the hypervisor, such as the ESXi host for VMWare.

Embodiments of the invention further relate to the allocation of resources from a holistic and/or localized perspective. Embodiments of the invention enable a splitter, which may have only a local perspective on the use and status of resources, to receive guidance regarding a system-wide or holistic perspective. This allows a local splitter to account for the relative priorities of various data protection operations in the system as a whole.

Embodiments of the invention further relate to replication systems or components or modules thereof that are configured to perform SLO-based prioritization of the consistency groups handled by the splitter or splitters. A splitter, for example, may be configured to account for local priorities as well as system-wide priorities including the priorities of consistency groups handled by other splitters in the system when performing operations such as evacuating the journal.

Figure 4:
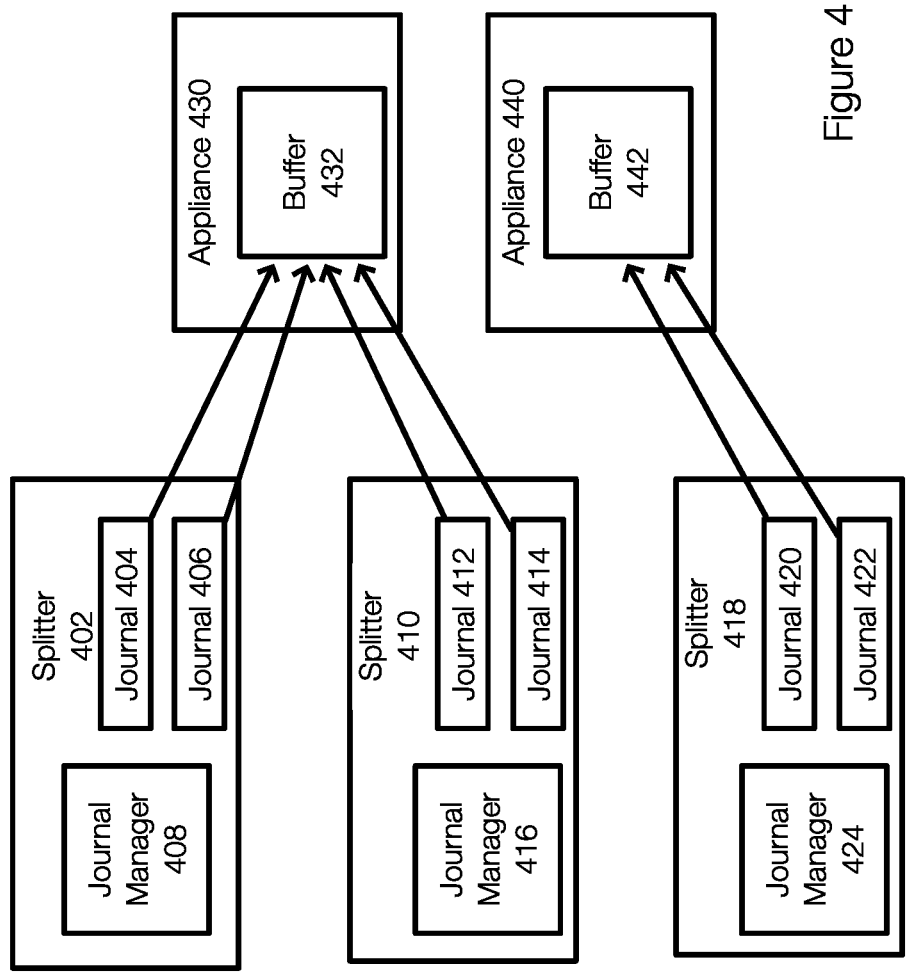
FIG. 4 illustrates an example of a production site and of a data protection system, including a splitter and an appliance, that is configured to perform replication of the production site.

FIG. 4 illustrates an example of a replication system that illustrates a part of the replication process between splitters and replication appliances. FIG. 4 illustrates splitters 402, 410, and 418. Each splitter 402, 410 and 418 is associated with journals (e.g., a journal for each consistency group) and a journal manager. The splitter 402 maintains journals 404 and 406 and includes the journal manager 408. The splitter 410 maintains the journals 412 and 414 and includes the journal manager 416. The splitter 418 maintains the journals 420 and 422 and includes the journal manager 424.

The data protection system may also include one or more replication appliances (or a cluster) such as appliance 430 and appliance 440. The appliance 430 may include a buffer 432 and other hardware including additional memory, processors or the like. The appliance 440 may include a buffer 442 and other hardware including additional memory, processors, networking equipment, or the like. The appliances 430 and 440 may be implemented physically or virtually.

FIG. 4 further illustrates that the replication process may include a series of buffers. The journals include the first buffers and the appliances include the next buffers. FIG. 4 illustrates a part of the replication that may occur at a production site. Similar buffers may be implemented at a replica site.

As illustrated in FIG. 4, the data from the journals may be sent to an appliance and different journals in the same splitter may be sent to different appliances in some examples. In one example, the journal manager 408 is responsible for sending data stored in the journals 404 and 406 to an appliance. In this example, the journal manager 408 sends data in the journals 404 and 406 to the appliance 430. The journal manager 416 also sends data in the journals 412 and 414 to the appliance 430. The journal manger 424 sends data in the journals 420 and 422 to the appliance 440.

When evacuating a journal or transmitting the data stored in a journal, the journal manager 408 (or more generally the splitter 402) may account for various parameters when prioritizing or when determining which data to send. These parameters may impact the evacuation speed for each journal or each consistency group at least because the parameters allow priorities and other factors or characteristics of the production system or replication system to be accounted for when transmitting data.

In this example, each of the journals or each of the consistency groups may be associated with a set of parameters. The parameters include, for each consistency group or each journal:

S—Speed of evacuation for the consistency group. The speed of evacuation may be determined in megabytes/second (MB/s).

RPO—RPO (Recovery Point Objective) for a consistency group. The RPO may be defined in seconds.

Pr—Pr is the adjusted priority of a consistency group. The adjusted priority is the base priority of the consistency group as defined by the user, which is adjusted based on the current lag of the consistency group. The current lag relates how much data is already accumulated and not sent to the appliance compared to the RPO for this consistency group. As the ratio between the current lag and RPO approaches (or passes) 1, the adjusted priority of the consistency group increases. This allows for responsiveness to the dynamic state of each consistency group and is an improvement compared to accounting only for a static priority.

Cap-S The Cap-S reflects the remaining capacity in the memory allocated to the splitter journal.

Embodiments of the invention may also account for other aspects of the replication system that may not be known to the splitter. These include:

BW—BW is the total network bandwidth between the splitter and the appliances for a given timeframe. Although different consistency groups may be replicated to different appliances, the overall network bandwidth is considered in this example. The total network bandwidth is not known to the splitter because the splitter may share the network link with other applications and users. As a result, the available bandwidth may not be known in advance.

Cap-RP The Cap-RP is the remaining capacity in the replication appliance for incoming $10s$. The replication appliance includes the next buffer in the chain. This value can be determined by the available memory in the appliance or any other limiting factor. This information is transmitted from the appliance to the splitter. However, this information is difficult to update continuously at least because the remaining capacity is continuously changing and changing rapidly. As a result, the splitter or splitters may not always have an accurate understanding of the Cap-RP value.

In addition to these parameters, the system may be constrained in other ways. For example, the total of data evacuated from all of the splitters or all of the journals ($\Sigma S_i$) must not exceed BW. Further, the total data evacuated or transmitted to a particular appliance $RPA_j$ must not exceed $Cap\text{-}RP_j$ of that appliance. Finally, the Cap-S must not drop to 0. A Cap-S value of 0 (zero) means that new data cannot be accepted by the splitter or at least for that journal or consistency group.

In some examples, both BW and $Cap\text{-}RP_j$ may be unknown, or outdated. As a result, the splitters need to adjust in real-time to transmissions being delayed or rejected because of a lack of resources.

Figure 5:
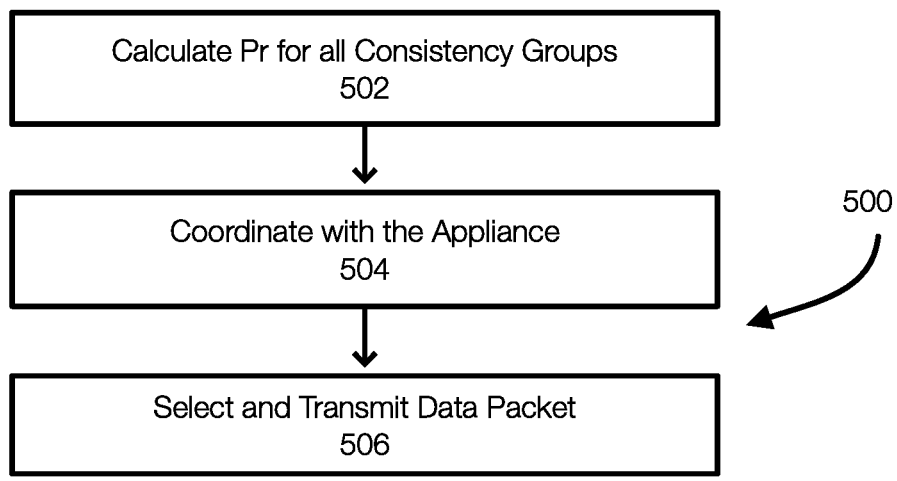
FIG. 5 illustrates an example of a method for prioritizing the transmission of data from a local perspective of a splitter.

FIG. 5 illustrates an example of a method performed by a splitter for performing a prioritization operation. The method 500 may be performed for each consistency group or for each journal. Further, the method 500 may be performed repeatedly (e.g., once a second or other time interval). Embodiments of the invention may repeatedly evaluate the prioritization such that the highest priority data is transmitted.

FIG. 5 is described for a splitter. Each splitter (or appliance) in the replication system, however, may perform the same or a similar method. In this example, the adjusted priority (Pr) is determined or calculated 502 for each consistency group or each journal. The calculation for each splitter may be performed by an appliance. With reference FIG. 4, the splitter 402 or the appliance 430 may calculate the Pr for the journal 404 (a first consistency group) and for the journal 406 (a second consistency group). In one example, determining the Pr for each consistency group may include normalizing the values such that the sum of the priorities for the consistency groups associated with the splitter equals 1 (e.g., $\Sigma Pr_i=1$). If a journal or consistency group does not have data to be evacuated, the adjusted priority Pr will be zero (0).

By calculating the adjusted Pr repeatedly or periodically, the splitter (and the replication system) is better able to operate in a manner that complies with any relevant SLOs.

In one example, the Pr is typically calculated by the appliance. For example, a consistency group may be split across multiple splitters and the splitter may not access to all of the needed information such as available bandwidth. As a result, the appliance may determine or calculate the Pr and then send the Pr to the respective splitters. Alternatively, the appliance may send raw data that allows the Pr and other statistics to be calculated.

The splitter also coordinates 504 with an appliance. The splitter may coordinate with the appliance on a per consistency group or per journal basis. For example, the splitter (or the journal manager) may send, after calculating the adjusted priority (or after receiving the adjusted priority from the appliance or after receiving raw data from which the Pr is calculated from the appliance), the total amount of data available in its journals and the amount of data that can be evacuated (the amount of free space can also be sent or determined). For example, the splitter 402 may send these values for the journal 404 and for the journal 406.

Coordinating 504 with the appliance may also include receiving a Cap-RP value from the appliance. Thus, the splitter 402 may receive the Cap-RP of the appliance 430 in this example. As discussed in more detail later, the Cap-RP value may be adjusted to accommodate global priorities.

For example, the Cap-RP is reported to be C MB. The Splitter has accumulated X+Y+Z MB from 3 consistency groups and is aware of the Pr for each consistency group. Naively, if X+Y+Z<C there is no problem sending out everything as fast as possible to the appliance. However, because the transfer of data takes time, and because time is also required to transfer the data from the appliance to the target, the memory may become scarce or unavailable right after sending X+Y+Z, and new data coming for X, which has a higher priority than Z cannot be evacuated. By way of example only, the calculation to send all data may done only if, for example, X+Y+Z<0.6*C.

If Z (lowest priority) does not have room on the appliance, it may be possible to release Z's data from the splitter memory. For example, the memory may be needed for data from higher priority X. Z will move to tracking/marking (e.g., MOH mode) and data is reread at a later time as discussed herein. Alternatively, the data of Z can be compressed at rest as described herein. Deciding when to move Z to marking or to another operational mode can be done when memory is exhausted in the splitter but that may be too late. The Cap-RP allows a determination to be made regarding whether it is useful to accumulate data for Z in the splitter memory. This memory, however, would likely be used for data from higher priority X when Cap-RP is low. As a result, resources may not be used on Z in this example.

Once the Cap-RP value is received, the splitter can select 506 the next data packet to be sent the appliance and then send or transmit that data packet. The next data packet to be sent, by way of example only, may be from the journal having the highest priority. In one example, a value r between 0 and 1 may be randomly selected. Then, the splitter may find i that is maximal value for which $\Sigma_0^i Pr_i<r$. The next packet is then send from the journal of the consistency group i. The splitter ensures that the amount data transmitted during the current time-window does not exceed the Cap-RP value.

The random choice of r and normalized values of Pr, mean that every consistency group i has a probability proportional to Pr, to be selected for sending the next packet, over a uniform distribution. In one example, the size of the data packet is fixed at a value that is large enough to enable aggregation benefits and IO coalescing, while being small enough to not saturate the appliance or the splitter. A reasonable minimal size is expected to be ~0.5 MB.

It is possible that the data of the selected consistency group cannot be sent because the data would exceed the Cap-RP of the appliance that is the target of the consistency group. In such a case, the splitter should repeat the random selection and choose a different packet to be sent.

The method 500 enables a single splitter to prioritize its journal evacuation in a local manner while accounting, at least in part, for the free space available at the appliance. As previously discussed, there may be cases where the consistency groups being replicated by a first splitter have a lower comparative priority to consistency groups being replicated by a second splitter. The first and second splitters are not aware of each other's characteristics. However, the appliance or cluster of appliances is typically aware of the characteristics or replication parameters of each splitter.

When the appliance coordinates with the splitter (e.g., 504 in FIG. 5), the Cap-RP may be adjusted to account for global priorities.

Figure 6:
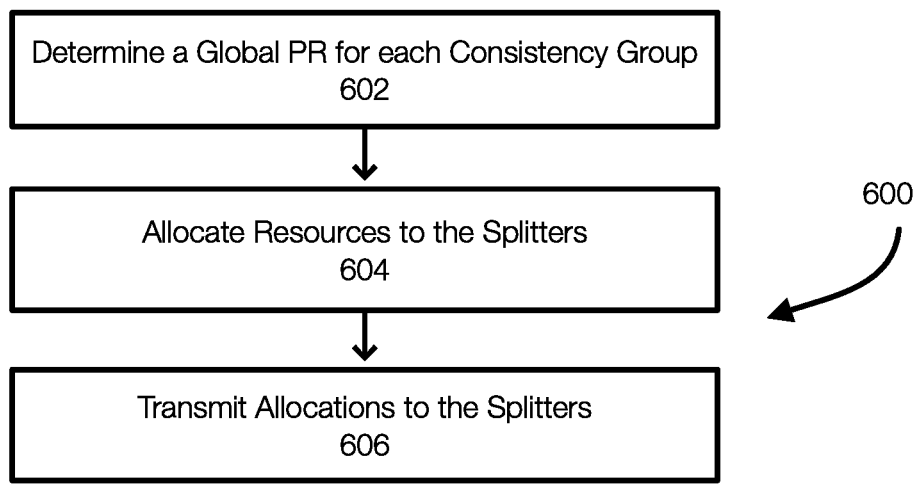
FIG. 6 illustrates an example of a method for prioritizing the transmission of data from a global perspective that accounts for multiple splitters.

FIG. 6 illustrates an example of a method for replicating data including a method for accommodating global priorities when replicating from multiple splitters. Generally, each appliance takes its objective Cap-RP value and divides it amongst the splitters in the replication system.

In FIG. 6, each appliance may calculate or determine 602 a global PR (different from the Pr values determined at the splitters) for each consistency group handled. With reference to FIG. 4, the appliance 430 may determine a global adjusted PR with respect to the journals 404, 406, 412, and 414. The adjusted PR value per handled consistency group is based on information sent by the splitters 402 and 410 on the current lag of each consistency group (journals, 404, 406, 412, and 414) and the RPO and priority of each consistency group. This is a process that is similar to the priority determined by the splitters. However, this process is performed from the perspective of the appliance and all of the consistency groups served by the appliance, which may be associated with multiple splitters.

The appliance then divides or allocates 604 its resources (e.g., the buffer for storing the IOs and metadata from the splitters) to the splitters. The appliance takes its objective Cap-RP (free memory/resources in its buffers) and divides it between the splitters according to the sum of the priorities for consistency groups handled by each splitter.

The appliance then sends or transmits 606 the adjusted Cap-RP values to the relevant splitters. With reference to FIG. 4, the splitter 410 may receive a first adjusted Cap-RP value based on the sum of the priorities of the consistency groups or journals 412 and 414 and the splitter 402 may receive a second Cap-RP value based on the sum of the priorities of the consistency groups or journals 404 and 406. The first and second Cap-RP values may be different and may sum to the objective Cap-RP value of the appliance 430.

Each appliance in a replication system is able to split its available resources based on the consistency groups global priorities PR, rather than a local prioritization as performed by the splitters. Further, the global prioritization takes the resources of the appliance into account. This allows the replication system or the data protection system to perform smart global resource management for data transfer or for data replication.

Each appliance may also consider its capability to clear out its own buffer when reporting available capacity back to the splitters. For example, if a production appliance cannot send data to the replica appliance, its Cap-RP value should be reduced. The Cap-RP value should be the current capacity available plus the projected amount of data that can be evacuated from its own buffers in the coming timeframe.

In one example, communication between the splitter and the appliance can be minimized or reduced by using a large value for the Cap-RP value (e.g., $\infty$). This may ignore limitations on the appliance side and the splitter will try to push as much data as possible to the appliance at any point in time. However, the splitter should be prepared to accept failures from the appliance due to lack or resources or to expect that latency may by higher when the ability of the splitter to send data to the appliance is throttled. In many cases, this simplified example of transmitting data from one or more splitters to an appliance is likely to achieve good results with respect to matching SLOs and prioritizing consistency groups. This version may also be a fallback operational mode when the system is constrained by network or CPU, and it is desirable to reduce the overhead of complicated processing and communication with the appliance.

Embodiments of the invention, which are configured to perform smart prioritization and quality of service control, may also perform adaptive compression as part of the prioritization and quality of service control. While it is possible to transmit the data in the splitter journals as-is (e.g., without compression) and simply consume bandwidth according to the size of the data, embodiments of the invention may improve the use of computing resources by compressing the data prior to transmission to the appliance.

Although compression can save on network bandwidth, compression may consume other resources such as processor cycles to perform the compression. In addition, the compression ratio is not known in advance and may vary. Encrypted data or pre-compressed data may not benefit from compression while textual data may achieve a compression ratio of 10:1 or more.

Embodiments of the invention may reduce latency by including a framework in the data protection system that compares the total latency of sending data the to the appliance with compression and sending the data without compression. The data protection system or the splitter may determine the following values:

- Average compression ratio this can be calculated by sampling data from the consistency group and compressing sampled data, or if compression is already turned on for this consistency group, monitoring the performance of the compression;
- Additional CPU cycles needed to compress this can be performed using a sample of the data of the consistency group or, using real data being compressed, the splitter can monitor the amount of CPU cycles or time required to compress a given amount of data from that specific consistency group;
- The bandwidth (BW) to each specific appliance. This can be monitored continuously as the splitter sends IO to the appliance.

With these values, the splitter can make an informed decision regarding whether to transmit the data as-is or compress the data and then transmit the data using the following calculations:

$$\text{CPU time needed to compress} + BW*\text{compressed-data-size} \quad (1)$$

$$BW*\text{original-data-size}. \quad (2)$$

If (1) is smaller than (2), then compression provides benefits in the data protection operation. If (2) is smaller than (1), the data is transmitted as-is without compression. This calculation can be repeated periodically or based on a period of time to re-evaluate the performance and optimize the transmission of data based on changing conditions. Determining whether to compress or not compress the data may be performed at intervals that are less frequent than for selecting which data to transmit as previously described. Determining whether to compress may be achieved when the splitter coordinates with the appliance.

In some examples, the resources available to the data protection system may be insufficient and embodiments of the invention further contemplate handling situation where the journal is full or nearly full. For example, the host memory available to the splitter may not be sufficient to meet the demand of incoming throughput. Another reason is that the splitter is unable to communicate with the appliance and this results in data accumulating in the splitter journal. As a result of these and other circumstances, resources may become scarce or unavailable.

If the splitter can no longer maintain the journal properly, the splitter may change the manner in which the IOs are stored in the splitter journal. For example, the splitter may only maintain or store metadata (e.g., location and size) for new IO data—the data itself is not stored in the splitter journal. This is an example of marking-on-host (MOH). By storing only the metadata, space in the journal is conserved. Changing to a different operational mode may be performed on a journal or consistency group basis. In other words, it may be possible to move less than all of the consistency groups to a different mode of operation.

If the splitter moves a consistency group to MOH mode, write ordering is no longer preserved for that consistency group. For example, if there are two writes to the same location, the splitter does know what the contents of the first IO were but only knows the content of the location after the second write (e.g., by reading that location from the production storage). In MOH mode, once replication resumes, the splitter notifies the appliance that non-ordered data is being sent. The appliance should, in this example, maintain the new data arriving from the splitter and mark a consistent snapshot once all the non-ordered data has been received and applied. One consequence is that any-PIT replication is lost, at least for a period of time associated with the MOH mode. However, a snapshot of the data, once the non-ordered data is applied, can be performed.

There may be no any-PiT replication in this case for a certain period of time, but rather just a snapshot of the data once all non-ordered data was applied.

Figure 7:
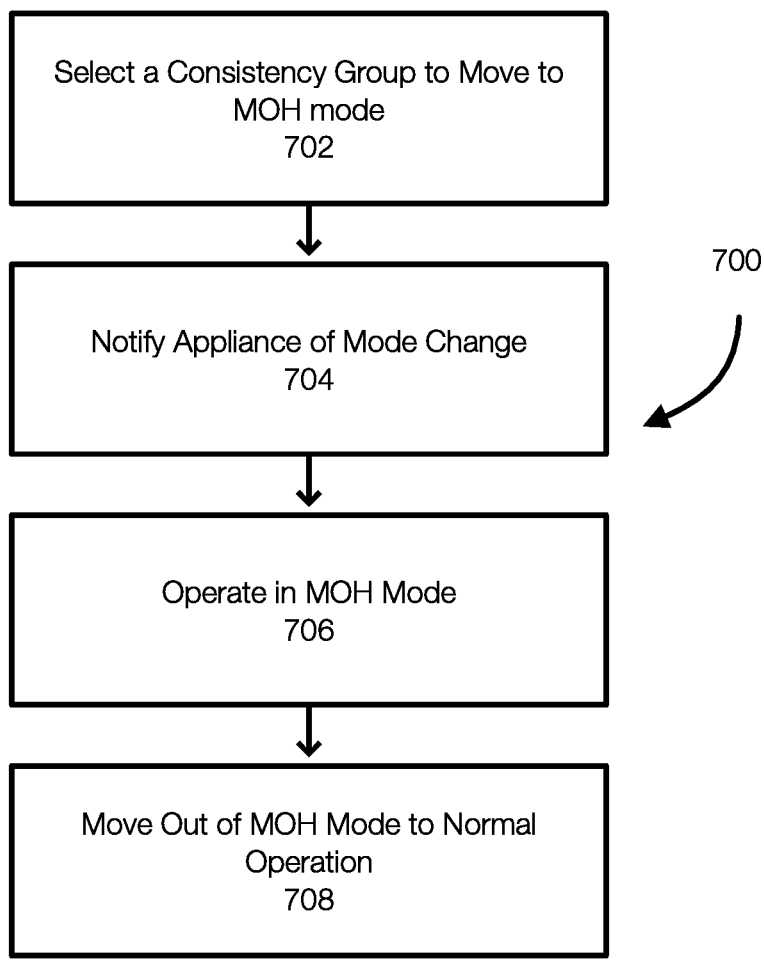
FIG. 7 illustrates an example of a method for performing prioritization and quality control when computing resources are low or unavailable.

FIG. 7 illustrates an example of handling situations where the splitter journal is full. The method 700 may detect a need to change operating modes based on the availably or state of the computing resources such as host memory. The method may select 702 one or more consistency groups to move to a different operating mode when this type of situation is detected. In one example, the consistency group is selected based on the priorities, which are determined as discussed herein. This ensures that the mode of a lower or the lowest priority consistency group is changed.

For consistency groups that have similar priorities, another criteria may be used. For example, the amount of incoming IO (load) to or from a consistency group may be used as the criteria. In one example, it is better to move a single high throughput to MOH mode than to move multiple lower throughput consistency groups to MOH mode.

Once the consistency group is moved to MOH mode (or during the process) the appliance is notified 704 of the mode change. The appliance is notified of which consistency groups have been moved to MOH mode.

The replication system or splitter may continue operation in this manner until the splitter journal has sufficient space to resume normal operation. In the MOH mode, the splitter only keeps metadata for new IOs arriving for the selected consistency group. When evacuating from the journal, the data corresponding to the retained metadata is read from storage and transmitted.

Once the journal has sufficient space or once the necessary resources are available, the consistency group operating in MOH mode is moved 708 out of MOH mode. To move a consistency group out of MOH mode, the splitter may return to normal processing internally. Thus, the full IO data and metadata are stored in the journal. The splitter continues to evacuate all of the metadata in the journal for that consistency group. If a new IO arrives that is overwriting a region already marked in the metadata stream, the splitter sends the IO to the appliance directly from the journal rather than the disk. Once the metadata accumulated while operating in MOH mode, the splitter can resume regular replication and notifies the appliance than normal replication is resuming. This point is declared as point in time consistent at the appliance.

Embodiments of the invention also relate to handling of bandwidth and journal-full situations using compression-at-rest. In one embodiment, instead of compressing the data prior to sending it over the wire, the data at rest in the splitter journal is compressed. More specifically, data is written to the splitter journal in an uncompressed form to avoid adding latency. The data is then compressed at rest in the journal. When compressing the data at rest in the journal, compressed chunks are written to the journal and the uncompressed data is deleted. When data is sent to the appliance, the data may be sent in a compressed form or decompressed and sent uncompressed.

Compressing the data at rest in the splitter journal provides more space for data in the journal. In one example, the priority for compression can be increased such that a move to MOH move is potentially avoided.

In one example, the decision of whether to compress is not before sending the data, but relates to available CPU and memory. For example, if the compression ratio is 10:1, the journals can contain 10 times the data to be kept, while also achieving better traffic utilization.

Embodiments of the invention provide smart prioritization of replication resource utilization, such that it matches the SLOs and priorities set by the user. This is achieved by controlling the actual data that is being sent from the splitter to the appliance, such that limited network bandwidth can be best utilized. Further, generating an exchange of data between the splitter and the appliance allows the use of resources to account for global prioritizations and/or local prioritizations. Embodiments of the invention are further enhanced using compression, in-memory compression at rest, or the like.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations including replication and replication related operations. More generally, the scope of the invention embraces any operating environment in which the disclosed concepts may be useful.

At least some embodiments of the invention provide for the implementation of the disclosed functionality in existing backup platforms, examples of which include the Dell-EMC RecoverPoint. In general however, the scope of the invention is not limited to any particular data backup platform or data storage or replication environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising determining a priority for each consistency group associated with a splitter, coordinating with an appliance to send an amount of data available in journals of the splitter that can be evacuated and to receive an amount of resources available at the appliance, and selecting data packets to send to the appliance based on the amount of memory available at the appliance and the priorities of the consistency groups.

Embodiment 2. The method of embodiment 1, further comprising normalizing the priorities of the consistency groups such that a sum of the priorities equals 1.

Embodiment 3. The method of embodiment 1 and/or 2, wherein the appliance coordinates with multiple appliances, further comprising: determining a global priority for each of the consistency groups associated with the multiple appliance, dividing the amount of resources available at the appliance between the multiple splitters, and sending an adjusted amount of resources to each splitter, wherein the adjusted amount of resources is different for each splitter and is based on the global priorities of the splitters.

Embodiment 4. The method of embodiment 1, 2, and/or 3, wherein the priority of each consistency group is based on a relationship between a current lag and a recovery point objective (RPO) of each consistency group.

Embodiment 5. The method of embodiment 1, 2, 3, and/or 4, wherein the relationship includes a ratio between the current lag and the RPO or wherein the relationship includes a ration between the current lag squared and the RPO.

Embodiment 6. The method of embodiment 1, 2, 3, 4, and/or 5, further comprising adjusting the adjusted amount of resources sent to each splitter when the appliance cannot evacuate its own buffer.

Embodiment 7. The method of embodiment 1, 2, 3, 4, 5, and/or 6, further comprising compressing the data of one or more of the consistency groups when compressing improves performance or reduces use of resources.

Embodiment 8. The method of embodiment 1, 2, 3, 4, 5, 6, and/or 7, further comprising changing a mode of operation of at least one consistency group when resources are unavailable to the splitter to a marking on host mode, wherein only metadata for the at least one consistency group is saved in the journal in the marking on host mode.

Embodiment 9. The method of embodiment 1, 2, 3, 4, 5, 6, 7, and/or 8, further comprising compressing the data at rest.

Embodiment 10. The method of embodiment 1, 2, 3, 4, 5, 6, 7, 8, and/or 9, further comprising repeatedly evaluating the priority of each consistency group.

Embodiment 11. The method of embodiment 1, 2, 3, 4, 5, 6, 7, 8, 9, and/or 10, wherein the selection of the data packet accounts for resources available to the splitter and resources available to the appliance.

Embodiment 12. The method as recited in in any one or more of or any portion of embodiments 1-11.

Embodiment 13. A non-transitory storage medium having stored therein instructions that are executable by one or more hardware processors to perform the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   operating a splitter in a computing system, wherein the splitter is associated with consistency groups, wherein each of the consistency groups includes a group of devices that is replicated together, wherein the splitter is configured to split writes directed to the group of devices to an appliance such that the writes to the group of devices are replicated to a destination, wherein writes associated with different consistency groups are stored in corresponding journals at the splitter;
   determining a priority for each consistency group associated with the splitter;
   coordinating with the appliance to send an amount of data available in the journals of the splitter that is prepared for evacuation and to receive an amount of resources available at the appliance;
   selecting data packets from the journals of the splitter based on the amount of resources available at the appliance and the priorities of the consistency groups; and
   sending the selected data packets to the appliance.

2. The method of claim 1, further comprising normalizing the priorities of the consistency groups such that a sum of the priorities equals 1.

3. The method of claim 1, wherein the appliance coordinates with multiple appliances and each of the multiple appliances is associated with a splitter, further comprising:
   determining a global priority for each of the consistency groups associated with the multiple appliances;
   dividing the amount of resources available at the appliance between the splitters associated with the multiple appliances; and
   sending an adjusted amount of resources to each of the splitters, wherein the adjusted amount of resources is different for each of the splitters and is based on the global priorities of the splitters.

4. The method of claim 1, wherein the priority of each consistency group is based on a relationship between a current lag and a recovery point objective (RPO) of each consistency group.

5. The method of claim 4, wherein the relationship includes a ratio between the current lag and the RPO or wherein the relationship includes a ration between the current lag squared and the RPO.

6. The method of claim 3, further comprising adjusting the adjusted amount of resources sent to each of the splitters when one of the appliances cannot evacuate its own buffer.

7. The method of claim 3, further comprising compressing the data of one or more of the consistency groups when compressing improves performance or reduces use of resources.

8. The method of claim 1, further comprising changing a mode of operation of at least one consistency group when resources are unavailable to the splitter to a marking on host mode, wherein only metadata for the at least one consistency group is saved in the journal in the marking on host mode.

9. The method of claim 7, further comprising compressing the data at rest.

10. The method of claim 1, further comprising repeatedly evaluating the priority of each consistency group.

11. The method of claim 1, wherein the selection of the data packet accounts for resources available to the splitter and resources available to the appliance.

12. A non-transitory storage medium having stored therein instructions that are executable by one or more hardware processors to perform operations comprising:
  operating a splitter in a computing system, wherein the splitter is associated with consistency groups, wherein each of the consistency groups includes a group of devices that is replicated together, wherein the splitter is configured to split writes directed to the group of devices to an appliance such that the writes to the group of devices are replicated to a destination, wherein writes associated with different consistency groups are stored in corresponding journals at the splitter;
  determining a priority for each consistency group associated with the splitter;
  coordinating with the appliance to send an amount of data available in the journals of the splitter that is prepared for evacuation and to receive an amount of resources available at the appliance;
  selecting data packets from the journals of the splitter based on the amount of resources available at the appliance and the priorities of the consistency groups, and
  sending the selected data packets to the appliance.

13. The non-transitory storage medium of claim 12, the operations further comprising normalizing the priorities of the consistency groups such that a sum of the priorities equals 1.

14. The non-transitory storage medium of claim 12, wherein the appliance coordinates with multiple appliances and each of the multiple appliances is associated with a splitter, further comprising:
  determining a global priority for each of the consistency groups associated with the multiple appliances;
  dividing the amount of resources available at the appliance between the splitters associated with the multiple appliances; and
  sending an adjusted amount of resources to each of the splitters, wherein the adjusted amount of resources is different for each of the splitters and is based on the global priorities of the splitters.

15. The non-transitory storage medium of claim 12, wherein the priority of each consistency group is based on a relationship between a current lag and a recovery point objective (RPO) of each consistency group.

16. The non-transitory storage medium of claim 14, the operations further comprising adjusting the adjusted amount of resources sent to each of the splitters when one of the appliances cannot evacuate its own buffer.

17. The non-transitory storage medium of claim 14, the operations further comprising compressing the data of one or more of the consistency groups when compressing improves performance or reduces use of resources.

18. The non-transitory storage medium of claim 12, the operations further comprising changing a mode of operation of at least one consistency group when resources are unavailable to the splitter to a marking on host mode, wherein only metadata for the at least one consistency group is saved in the journal in the marking on host mode.

19. The non-transitory storage medium of claim 17, the operations further comprising compressing the data at rest.

20. The non-transitory storage medium of claim 12, the operations further comprising repeatedly evaluating the priority of each consistency group.

* * * * *